United States Patent [19]

Davis

[11] 3,980,358

[45] Sept. 14, 1976

[54] AXIAL VIBRATION DAMPER FOR FLOATING BEARINGS

[75] Inventor: Lawrence P. Davis, Phoenix, Ariz.

[73] Assignee: Sperry Rand Corporation, New York, N.Y.

[22] Filed: Feb. 26, 1975

[21] Appl. No.: 553,189

[52] U.S. Cl. ............................... 308/173; 74/5 R; 308/176; 308/178; 308/184 R; 308/189 R
[51] Int. Cl.² ........................................ F16C 19/00
[58] Field of Search ............... 74/5 R, 5.8; 308/173, 308/176, 178, 179, 184, 189

[56] References Cited
UNITED STATES PATENTS 3,742,769   7/1973   Crutcher ............................ 74/5 R Primary Examiner—M. H. Wood, Jr.
Assistant Examiner—Richard A. Bertsch
Attorney, Agent, or Firm—Howard P. Terry; Thomas J. Scott

[57] ABSTRACT

A floating bearing having a stationary member and an axially translating member including a pair of O-rings which in combination with surfaces of the movable member and the stationary member define a contained space which is further subdivided by an extension of a surface of either the translating member or the stationary member to form two chambers substantially enclosed but connected through a restricted space formed by the extremity of the extension and a proximate opposing surface of the other member. The chambers are substantially filled with a viscous fluid which provides damping of axial displacements of said movable member relative to said stationary member produced in vibratory environments.

12 Claims, 7 Drawing Figures

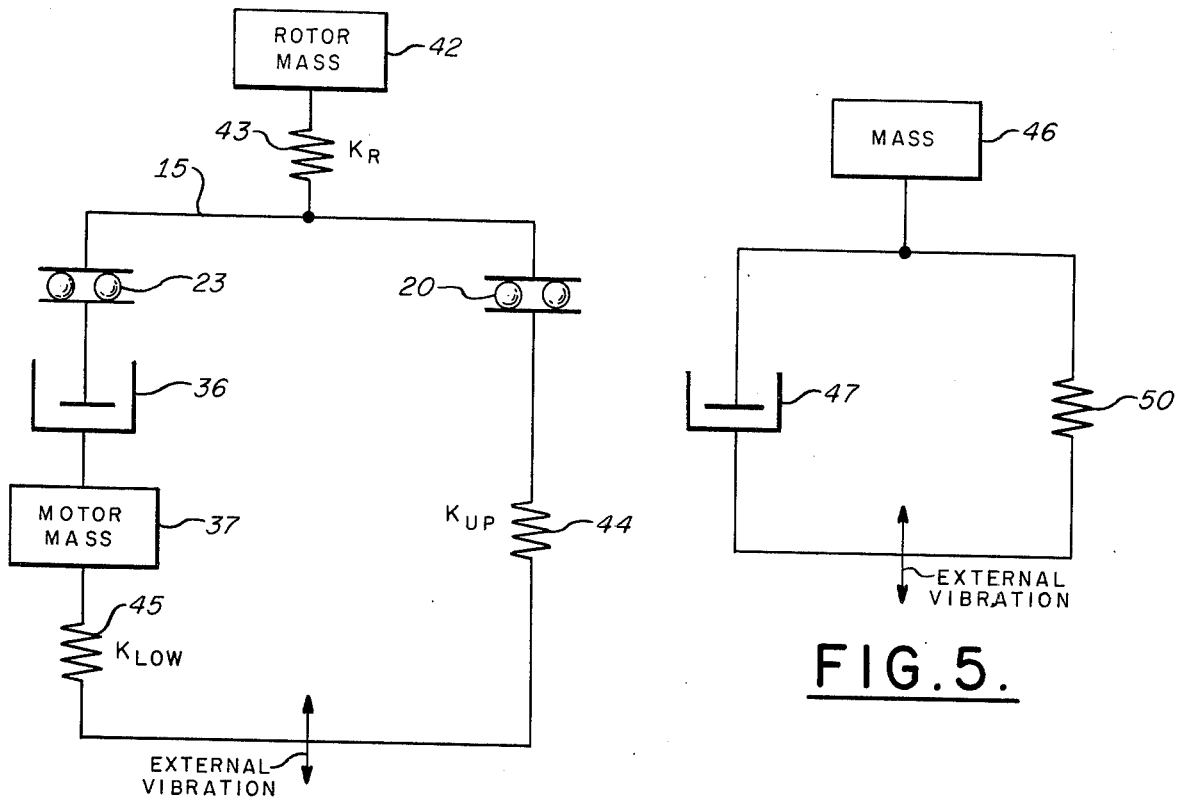
FIG.4.
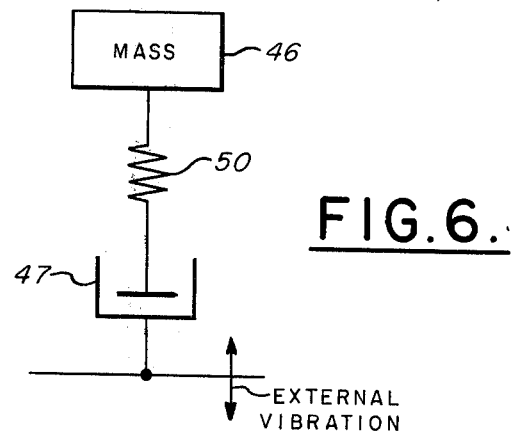
FIG.5.
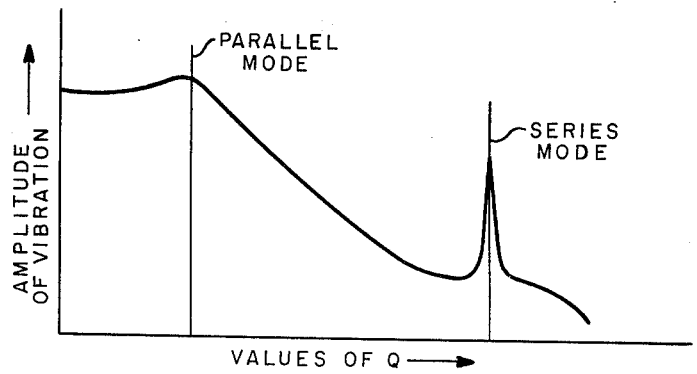
FIG.6.
FIG.7.

AXIAL VIBRATION DAMPER FOR FLOATING BEARINGS

BACKGROUND OF THE INVENTION

1. Field of the Invention

The subject invention pertains to the field of floating bearings and particularly to combinations of fixed bearing and floating bearing assemblies which find application in gyroscopic spin bearings and, particularly, to gyroscopic spin bearings incorporated in control moment gyroscopes or reaction wheel assemblies for use in space vehicles and communication satellites.

2. Description of the Prior Art

U.S. Pat. No. 3,742,769 entitled "Gyroscope" issued July 3, 1973 in the names of J. E. Crutcher and L. P. Davis and assigned to the same assignee as the subject application, discloses a gyroscope particularly adaptable for use in stabilizing space vehicles and satellites. As disclosed therein, a rotor is supported for rotation about its spin axis by a pair of oppositely disposed hubs which are each journaled in a pair of spin bearings. As further disclosed in U.S. application Ser. No. 312,241, now U.S. Pat. No. 3,897,985, entitled "Aligning Means for Bearings", filed Dec. 4, 1972 in the names of L. P. Davis and J. E. Crutcher, one of the pair of bearings may be a floating bearing assembly which includes a rotatable member or shaft coupled to the rotor shell and rotatable about a spin axis. The bearing assembly incorporates a floating bearing cartridge which includes a pair of duplex bearings having inner and outer bearing races and a common outer sleeve assembly which serves to clamp the duplex bearing outer races under a predetermined preload. The outer surface of the bearing cartridge is permitted to translate along the spin axis under changes in ambient operating temperature or pressure differential.

As further disclosed in the referenced application, the bearing assembly may include a pair of perimetrical grooves which have a pair of resilient O-rings disposed therein which maintain the bearing cartridge in alignment with respect to the housing during periods of displacement along the spin axis. The O-rings rotate about their respective annular axis in response to translational displacements of the bearing cartridge along the spin axis while producing only low frictional restraining forces that act on the bearing cartridge.

A modification of the invention disclosed in the above referenced application provides improved operation of the gyroscope in a high vibratory environment by the addition of a fluid in the clearance gap formed between the bearing cartridge, the housing and the spaced O-rings. In this modification a quantity of incompressible viscous fluid is inserted in the gap and retained therein by the spaced O-rings. This configuration provides additional radial damping in a high vibratory environment due to the squeeze film action of the incompressible viscous fluid.

The present invention is an improvement over the modification of the invention disclosed in the referenced patent application by providing means for axial damping the floating bearing operating in a high vibratory environment.

SUMMARY OF THE INVENTION

An improvement in a floating bearing assembly including a bearing cartridge disposed within a bearing housing for accommodating translational relative motion of the bearing cartridge along the spin axis of the bearing and a pair of O-rings disposed between the bearing cartridge and the bearing housing for providing an enclosed space defined by the O-rings and the surfaces of the bearing cartridge and the bearing housing. The improvement comprising an extending surface which may be a projection from a surface of the bearing cartridge or a surface of the bearing housing for substantially subdividing the defined space into two chambers connected through a restricted space between the extremity of the extending surface and a proximate opposing surface. The defined space is enlarged to accommodate a greater quantity of a viscous fluid which substantially fills the individual chambers and coacts with the extended surface to damp the axial vibrations of the floating bearing assembly thereby increasing the load carrying capacity in an axial direction of the floating bearing assembly.

In a gyroscopic application the floating bearing is combined with a fixed bearing which must be designed to bear a maximum axial load. The present invention increases the axial load carrying capacity of the floating bearing thereby reducing the required size of the fixed bearing support which in turn reduces the power requirement to operate the gyroscopic apparatus.

BRIEF DESCRIPTION OF THE DRAWINGS

FIG. 4 is a simplified presentation of the mechanical schematic shown in FIG. 3;

FIG. 5 is a mechanical schematic diagram of an axial damper coupled in parallel to a resilient member having a given spring constant;

FIG. 6 is a mechanical schematic diagram of an axial damper coupled in series with a resilient member having a given spring constant; and FIG. 7 is a graph of amplitude of vibration versus values of Q for an RWA incorporating the subject invention.

DESCRIPTION OF THE PREFERRED EMBODIMENT

Figure 1:
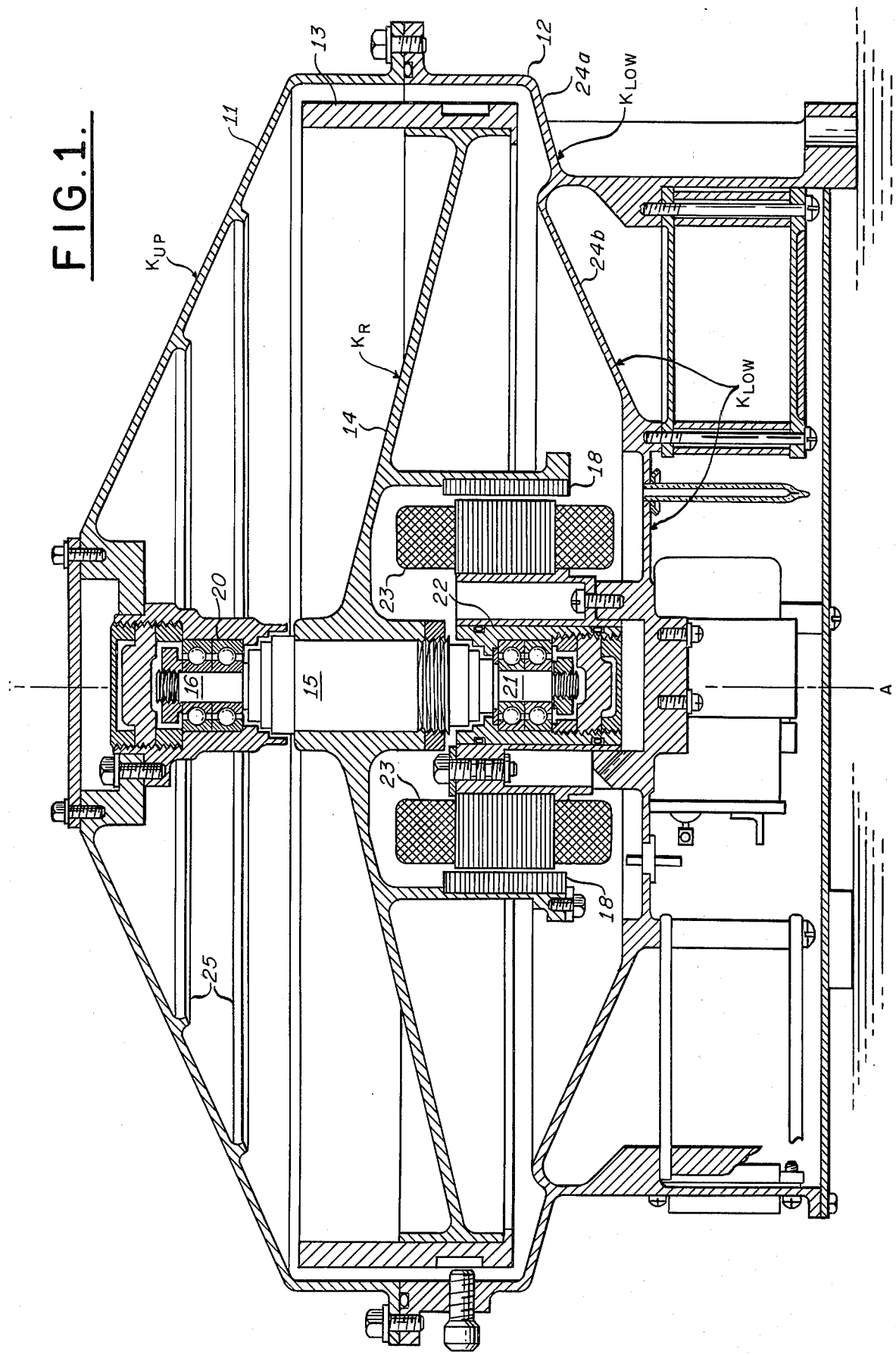
FIG. 1 is a sectional view of a Reaction Wheel Assembly incorporating the subject invention.

As shown in FIG. 1, a Reaction Wheel Assembly 10 includes an upper housing assembly 11 and a lower housing assembly 12. Disposed within the upper and lower housing assemblies 11, 12 is a large inertial element or rotor 13 which is supported through a suspension web 14 on a shaft 15 which has a first end 16 supported in a fixed bearing assembly 20 and a second end 21 supported in a floating bearing assembly 22. The rotor 13 is rotatably driven by a two-phase a.c. induction motor 23 which alternatively may be a BDCM.

The lower housing assembly 12 includes resilient sections 24a, 24b and 24c which together have a spring constant designated $k_{low}$. The upper housing assembly 11 is in the form of a conical housing which is reinforced by annular ribs 25 which are easy to produce on a machine and just as effective as radial ribs in preventing localized dents on the surface of the conically shaped upper housing assembly 11. The conical shaped surface of the upper housing assembly has a total spring constant associated therewith which is designated $k_{up}$.

The fixed bearing assembly 20 is a typical spin bearing in that it has its inner race fixed to the end 16 of the shaft 15 and its outer race fixed to a non-rotating member or upper housing assembly 11 of the reaction wheel assembly 10. The floating bearing 22 or bearing pair in the case of duplex assemblies is a floating spin bearing in that it has its inner race fixed to the end 21 of the shaft 15 for rotation therewith and has its outer race "floating", i.e., free to slide axially along the A—A axis with respect to a non-rotating part or lower housing assembly 12 of the reaction wheel assembly 10. This combination of bearings permits the housing comprised of the upper and lower housing assemblies 11 and 12 to have different amounts of geometrical change from the shaft 15. These changes are due to variations in ambient conditions including temperature and pressure.

Designs employing the combination of a fixed spin bearing and a floating spin bearing require that the fixed bearing must be of sufficient size to carry the entire axial load without failing. While the axial load on the fixed bearing in a space environment is substantially nonexistent, there is considerable axial load on the fixed bearing during missile launch. The axial load is comprised of the weight of the rotating parts in the reaction wheel assembly 10 in a 1 g environment. In a vibratory environment such as during launch, the load is amplified and this amplification may be increased by a factor of 10 to 50 at the structural resonance of the reaction wheel assembly 10. The combination of the spring constant $k_{up}$ associated with the upper housing assembly 11 and the spring constant $k_{low}$ associated with the lower housing assembly 12 is a second order mechanical assembly which at resonance provides the aforementioned very high amplification factors.

Figure 3:
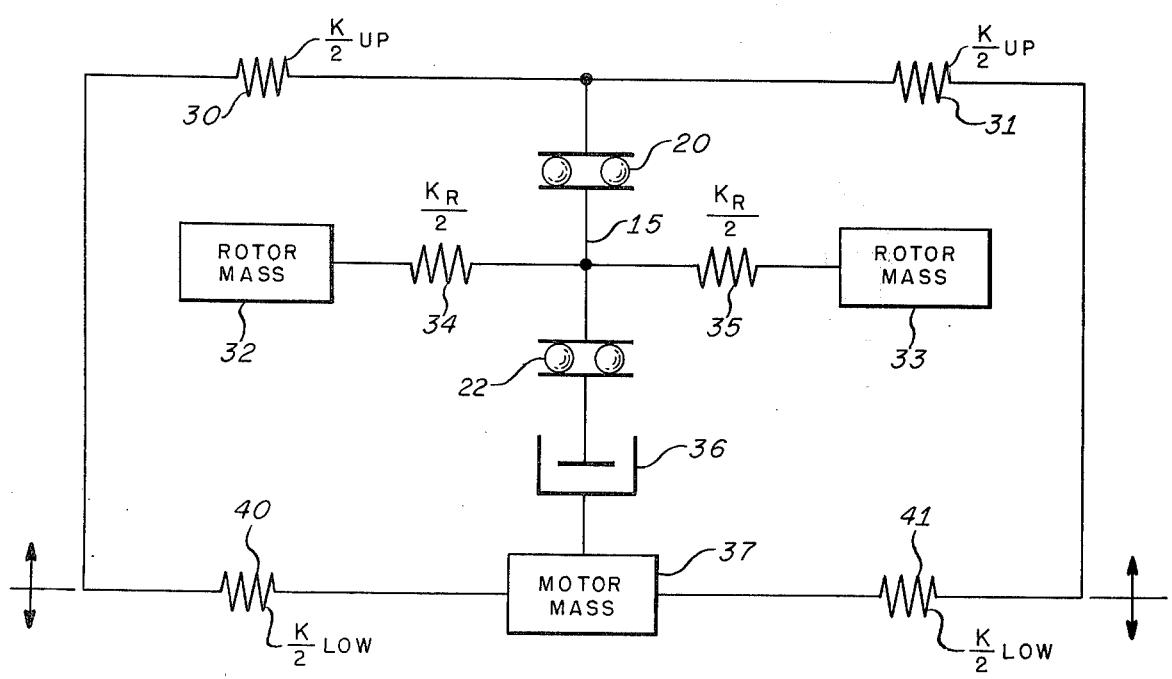
FIG. 3 is a mechanical schematic of the reaction wheel assembly including the subject invention.

FIG. 3 shows the mechanical schematic of the reaction wheel assembly 10 incorporating the axial vibration damper of the subject invention. The spring constant $k_{up}$ is shown as two springs 30 and 31 to the left and right of the schematically represented fixed bearing assembly 20. Each spring represents one-half of the spring constant $k_{up}$. In a similar manner the rotor mass is shown as two masses, 32 and 33, to the left and right of the shaft 15 coupled therethrough by one-half the spring constant $k_R$ of the rotor 13 represented by the springs 34 and 35 respectively. The axial vibration damper 36 is coupled between the schematic representation of the floating bearing 22 and the motor mass 37. The spring constant $k_{low}$ of the lower housing assembly 12 is shown schematically as two springs 40 and 41 which each represent one-half the spring constant $k_{low}$ of the lower housing assembly 12 and which are coupled respectively between the motor mass 37 and the springs 30, 31. The arrows to the left and right of FIG. 3 represent the external vibration imposed upon the reaction wheel assembly 10.

FIG. 4 is a simplified equivalent circuit of the mechanical schematic shown in FIG. 3. The rotor mass 42 is equivalent to the rotor masses 32 and 33, the spring constant $k_R$ of the rotor 13 is represented by the spring 43, the spring 44 is equivalent to the springs 30, 31 of the upper housing assembly 11 and the spring 45 is equivalent to the springs 40, 41 of the lower housing assembly 12. The upper and lower bearings 20 and 23 respectively and the axial vibration damper 36 are represented by the same reference numerals in FIG. 4 as in FIG. 3.

The basic difference between the equivalent mechanical schematic of FIG. 4 and the mechanical schematic of FIG. 3 is that the upper bearing 20 and the spring 44 which represents the spring constant $k_{up}$ are shown as a series mechanical circuit connected in parallel with the lower bearing 22, the axial vibration damper 36, the motor mass 37 and the spring 45 which represents the spring constant $k_{low}$ of the lower housing assembly 12. The external vibrations are represented by a single double-headed arrow at the bottom of FIG. 4. From this equivalent circuit it will be apparent that the effect of the axial vibration damper 36 is increased as the ratio $k_{low}/k_{up}$ is increased. In addition, the effect of the axial vibration damper 36 is further increased as the ratio of the rotor spring constant $k_R$ is increased with respect to either the lower housing spring constant $k_{low}$ or the upper housing spring constant $k_{up}$.

The simplified schematic diagram in FIG. 5 of a parallel mechanical circuit includes a mass 46 series coupled to a parallel circuit comprised of a damper 47 such as the axial damper in the subject invention and a spring 50 which may represent a spring constant such as the spring constant $k_{up}$ of the upper housing assembly 11 in the reaction wheel assembly 10. An external vibration applied to the parallel mechanical system is indicated by the double-headed arrow at the junction between the damper 47 and the spring 50. The parallel connected damper 47 can be most effective because it may be designed to provide critical damping in the system, i.e., the response of the system to the external vibration will come to rest in the shortest time without any overshoot.

FIG. 6 illustrates a schematic diagram of a series mechanical circuit in which the mass 46 is coupled through the spring 50 to the damper 47. In this system the damper is not as effective as in the parallel coupled mechanical system of FIG. 5 because the damper can not be designed to provide critical damping. As a result, it will be appreciated that the reaction wheel assembly 10, as shown in the equivalent schematic diagram of FIG. 4, may be designed to approach the parallel system of FIG. 5 by making the ratio of the lower housing spring constant $k_{low}/k_{up}$ very much greater than 1 and by designing the rotor 13 to have a spring constant $k_R$ which is very much greater than the lower housing assembly spring constant $k_{low}$.

In actual practice this design does not completely eliminate the series mode of vibration indicated in the mechanical schematic of FIG. 6 but it does displace the resonance of the reaction wheel assembly 10 to a frequency which is well above the parallel mode of operation. In effect, the structural resonance of the second order mechanical assembly, comprising the reaction wheel assembly 10, is isolated by the low mode. This is illustrated in the graph shown in FIG. 7 in which the values of the amplitudes of vibration are plotted against the values of Q for the reaction wheel assembly 10. As indicated therein, the parallel mode of vibration occurs at low values of Q while the series mode of vibration occurs at the higher values of Q thereby placing the structural resonance at a frequency well above the parallel mode of vibration.

Figure 2:
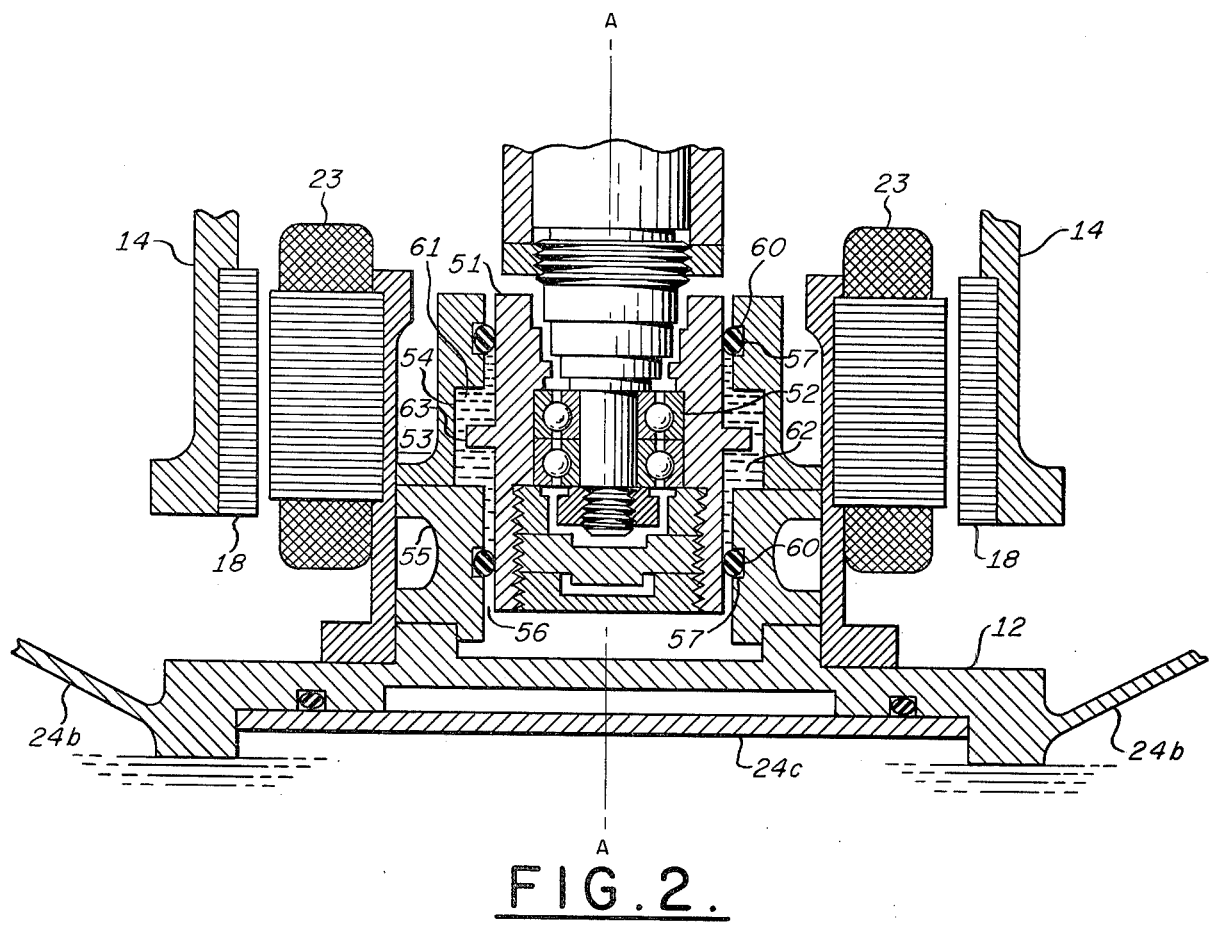
FIG. 2 is a detail of the sectional view shown in FIG. 1.

FIG. 2, which is a detail of the floating bearing assembly 22, incorporated in the reaction wheel assembly 10 of FIG. 1, includes the spin motor 23 which is fixed to the lower housing assembly 12 and drives the rotor through the hysteresis material 18 affixed to an extension of the suspension web 14 of the rotor 13. The floating bearing assembly 22 includes a bearing cartridge 51 which encloses a pair of duplex bearings 52 having inner and outer bearing races and a common outer sleeve assembly serving to clamp the duplex bearing outer races under a predetermined preload. The bearing cartridge 51 translates in an axial direction along the spin axis A—A of the shaft 15 in response to changes in the ambient operating temperature or pressure differential. A stationary bearing housing member 53 which may be comprised of a first section 54 and a second section 55 is fixed to the lower housing assembly and forms an internal clearance bore which accommodates the bearing cartridge 51 therein.

The stationary bearing housing member 53, as shown in FIG. 2, includes a pair of perimetrical grooves 57 in which a standard resilient O-ring 60, as well known in the industry, is disposed in each groove. The O-rings 60 maintain the bearing cartridge 51 radially aligned within the clearance bore 60 while producing only minimal frictional resistance to translational motion of the bearing cartridge 51 with respect to the stationary bearing housing member 53 as fully taught in the above referenced co-pending U.S. application Ser. No. 312,241, now U.S. Pat. No. 3,897,985.

The interior surfaces of the stationary bearing housing member in combination with the exterior surface of the bearing cartridge 51 and the O-rings 60 define an enclosed space having an increased volume obtained by cutting back a portion of the interior surface of the stationary bearing housing member 53. As shown in FIG. 2, this enlargement of the defined space if provided by increasing the clearance between a portion of the internal surface of the first section 54 and the external surface of the bearing cartridge 51. The enlarged defined space 61 is filled with a viscous fluid 62. This fluid should be compatible with the bearing lubricant which is a petroleum base fluid such as Kendall by Kendall Oil Corp. or Exxo V–79, manufactured by Exxon Corp.

In order to provide means for axially damping the translational displacements of the bearing cartridge 51, a projection of the exterior surface 51 is provided which substantially subdivides the defined space into two chambers which are connected through a restricted area formed by the extremity of the projection 63 and the proximate interior surface of the stationary bearing housing member 53.

In operation when a vibratory force is applied to the lower housing assembly 12 which tends to displace the bearing cartridge 51 translationally along the spin axis A—A, the fluid 62 will tend to oppose movement of the projection 63 in the vertical direction by being squeezed through the restricted space between the two chambers. The resistance of the fluid 62 to movement of the projection 63 produces axial damping of displacements of the bearing cartridge 51.

It will be obvious to those skilled in the art that modifications to the preferred embodiment can be made which include forming the perimetrical grooves 57 in the exterior surface of the bearing cartridge 51, and forming the projection 63 on the interior surface of the stationary bearing housing member 53. In addition, the projection 63 may be machined into the desired surface or alternatively a projecting member could be press-fitted or otherwise fixed into the surface of the desired member.

While the invention has been described in its preferred embodiments, it is to be understood that the words which have been used are words of description rather than limitation and that changes may be made within the purview of the appended claims without departing from the true scope and spirit of the invention in its broader aspects.

I claim:
1. A floating bearing assembly comprising
 stationary member means,
 movable member means radially separated from said stationary member means and coaxially positioned with respect to said stationary member means for accommodating axial displacements relative to said stationary member means,
 annular shaped O-ring resilient means being annularly and radially resilient disposed within at least two perimetrical grooves formed within said stationary member means for cooperating with adjacent surfaces of said stationary member means and said movable member means to form a defined space,
 partition means for dividing said defined space into two chambers connected through a restricted space, and
 fluid means substantially filling said chambers and coacting with said partition means to provide damping of said axial displacements of said movable member means relative to said stationary member means in response to external vibrations.

2. A floating bearing assembly as recited in claim 1 in which said partition means includes an extension of the surface of said movable member means and the radial length of said partition means is slightly less than the radial separation between said stationary member means and said movable member means thereby forming a restricted space for connecting said two chambers.

3. A floating bearing assembly as recited in claim 1 in which said partition means includes an extension of a surface of said stationary member means proximate a surface of said movable member means and the radial length of said partition means is slightly less than the radial separation between said stationary member means and said movable member means thereby forming said restricted space for connecting said two chambers.

4. In a gyroscopic apparatus including a rotor supported on a shaft journaled at one end thereof in a fixed spin bearing having a predetermined load carrying capacity and journaled at the other end thereof in an improved floating spin bearing comprising
 stationary member means,
 movable member means radially separated from said stationary member means and coaxially positioned with respect to said stationary member means for accommodating axial displacements relative to said stationary member means,
 annular shaped O-ring resilient means being annularly and radially resilient disposed within at least two perimetrical grooves formed within said floating bearing for cooperating with adjacent surfaces of said stationary member means and said movable member means to form a defined space,
 partition means for dividing said defined space into two chambers connected through a restricted space, and
 fluid means substantially filling said chambers and coacting with said partition means to provide an axial load carrying capacity for said floating bearing means thereby allowing said predetermined load bearing capacity of said fixed bearing means to be substantially reduced.

5. In a gyroscopic apparatus as recited in claim 4 wherein said movable member means includes bearing cartridge means enclosing spin bearing means having an inner race fixed with respect to said rotor.

6. In a gyroscopic apparatus as recited in claim 4 wherein said annular shaped O-ring resilient means includes means disposed within at least two perimetrical grooves formed within said stationary member means.

7. In a gyroscopic apparatus as recited in claim 4 wherein said annular shaped O-ring resilient means includes means disposed within at least two perimetrical grooves formed within said movable member means.

8. In a gyroscopic apparatus as recited in claim 4 wherein said stationary member means includes a first section and a second section, said second section having a portion which is cut back to be further radially separated from said movable member means than adjacent portions of said first and second sections thereby forming an enlarged defined space.

9. In a gyroscopic apparatus as recited in claim 4 wherein said partition means includes a projection of a surface of said movable member extending into said defined space from the exterior surface of said movable member means radially in the direction toward the interior surface of said stationary member means.

10. In a gyroscopic apparatus as recited in claim 4 wherein said partition means includes a projection of the interior surface of said stationary member means which projects radially into said defined space toward the exterior surface of said movable member means.

11. In a gyroscopic apparatus as recited in claim 4 wherein said partition means includes a rim means fixed to the exterior surface of said movable member means for projecting into said defined space radially toward said stationary member means.

12. In a gyroscopic apparatus as recited in claim 4 wherein said fluid means includes an incompressible viscous fluid.

* * * * *